Dec. 20, 1966   S. J. MARWIL   3,293,000
WITHDRAWAL OF SOLIDS FROM A FLOWING STREAM
COMPRISING A SLURRY OF SAME
Filed Oct. 5, 1962   3 Sheets-Sheet 1

INVENTOR.
S. J. MARWIL
BY Young & Quigg
ATTORNEYS

INVENTOR.
S. J. MARWIL

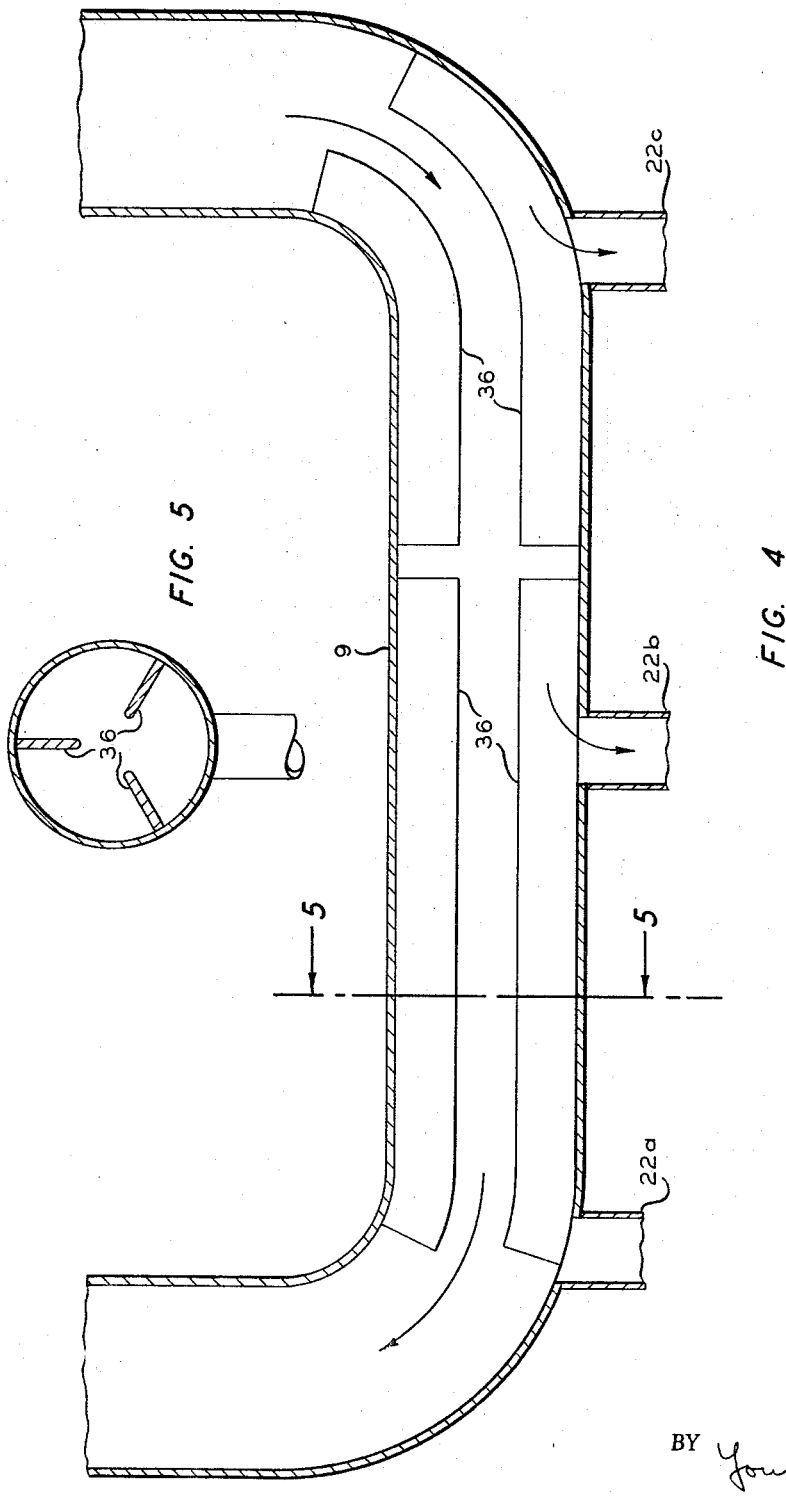

United States Patent Office 3,293,000
Patented Dec. 20, 1966

3,293,000
WITHDRAWAL OF SOLIDS FROM A FLOWING STREAM COMPRISING A SLURRY OF SAME
Stanley J. Marwil, Bartlesville, Okla., assignor to Phillips Petroleum Company, a corporation of Delaware
Filed Oct. 5, 1962, Ser. No. 228,614
3 Claims. (Cl. 23—285)

This invention relates to the withdrawal of solids from a flowing stream comprising a slurry of such solids. In another aspect, it relates to a method and apparatus for withdrawing solids, such as particle-form polymer, from a flowing stream comprising a slurry of such solids, for example a stream of polymerization mixture continuously flowing in a polymerization loop reactor.

In many industrial processes a slurry of solids in liquid is passed in a flowing stream through a horizontal pipe or the like, often at high velocity and turbulence, and a fraction of the solids are gravitationally drawn off by means of a depending pipe or the like. For example, in the polymerization of 1-olefins to produce particle-form polymer in a tubular closed loop reactor where a slurry of solid particle-form polymer in liquid hydrocarbon diluent flows in a continuous path in the highly turbulent flow range, settling legs or drawoff pipes are attached to the lower horizontal section of the loop reactor to gravitationally draw off a concentrated fraction of the solid polymer. Because of the turbulent nature of the slurry flowing past the inlet ends of the settling legs, eddy currents are set up in the settling legs which have an unstable effect on the gravitational settling of the polymer solids in the settling legs, tending to delimit the concentrating of solids therein. As a result, the slurry of concentrated solid polymer drawn off from the settling legs is not as concentrated as desired and the accompanying liquid diluent and hydrocarbon reactant are present in the drawn off polymer stream in relatively high concentrations. This means that the diluent and reactant recovery system must be of large capacity and the amounts of recycled diluent and reactant are high. Further, the low rate of solids withdrawal decreases production rate in the tubular loop reactor by virtue of decreased residence time. Thus, there has arisen a need for improved method and means for withdrawing solids from such a system.

Accordingly, an object of this invention is to improve the withdrawal of solids from a flowing stream comprising a slurry of such solids. Another object is to provide an improved method and apparatus for withdrawing solids, such as particle-form polymer, from a flowing stream comprising a slurry of the same, for example the polymerization reaction mixture continuously circulated in a polymerization loop reactor. Another object is to provide an improved method and apparatus for concentrating settled solids drawn off from a flowing stream comprising the same. Further objects and advantages of this invention will become apparent to those skilled in the art from the following discussion, appended claims, accompanying drawing in which:

FIGURE 4 is an elevational view in section of a portion of FIGURE 1 illustrating another embodiment of this invention; and FIGURE 5 is a cross sectional view of FIGURE 4 taken along the plane indicated.

Briefly, I have discovered, in a system in which solids are allowed to gravitate from a horizontal flowing stream comprising a slurry of such solids in a liquid and flow into a depending solids settling zone, from which a concentrated slurry of solids is periodically withdrawn, the improvement comprising radially obstructing the peripheral portion of the gravitating stream and/or the peripheral portion of the horizontal flowing stream adjacent the inlet of said settling zone. Such obstruction results in concentration of the fraction of solids which gravitate in said settling zone, thereby overcoming the effects of eddy currents in the vicinity of the inlet of the settling zone which would otherwise tend to delimit the concentrating of the settled solids in the settling zone. This improvement can be accomplished by provision of a plurality of spaced radial vanes or baffles in the periphery of the inlet of the depending settling zone or in the periphery of the horizontal pipe conveying the slurry adjacent said inlet.

My invention finds particular application in gravitationally withdrawing concentrated solid particle-form polymer from a tubular closed loop reaction zone in which is continuously circulated at high velocities a slurry comprising said polymer, liquid diluent in which a substantial amount of the polymer is insoluble (e.g., 60 to 95 percent), catalyst and hydrocarbon reactant, and this invention will be illustrated in connection with such a process. However, it should be understood that the invention is not to be limited unduly thereto, since it will find application wherever it is desired to gravitationally withdraw particulate solids from a flowing stream comprising a slurry of such solids. For example, the invention is also applicable in the case of slurries of coal solids in water, slurries of ground ores in leaching effluent, etc.

Figure 1:
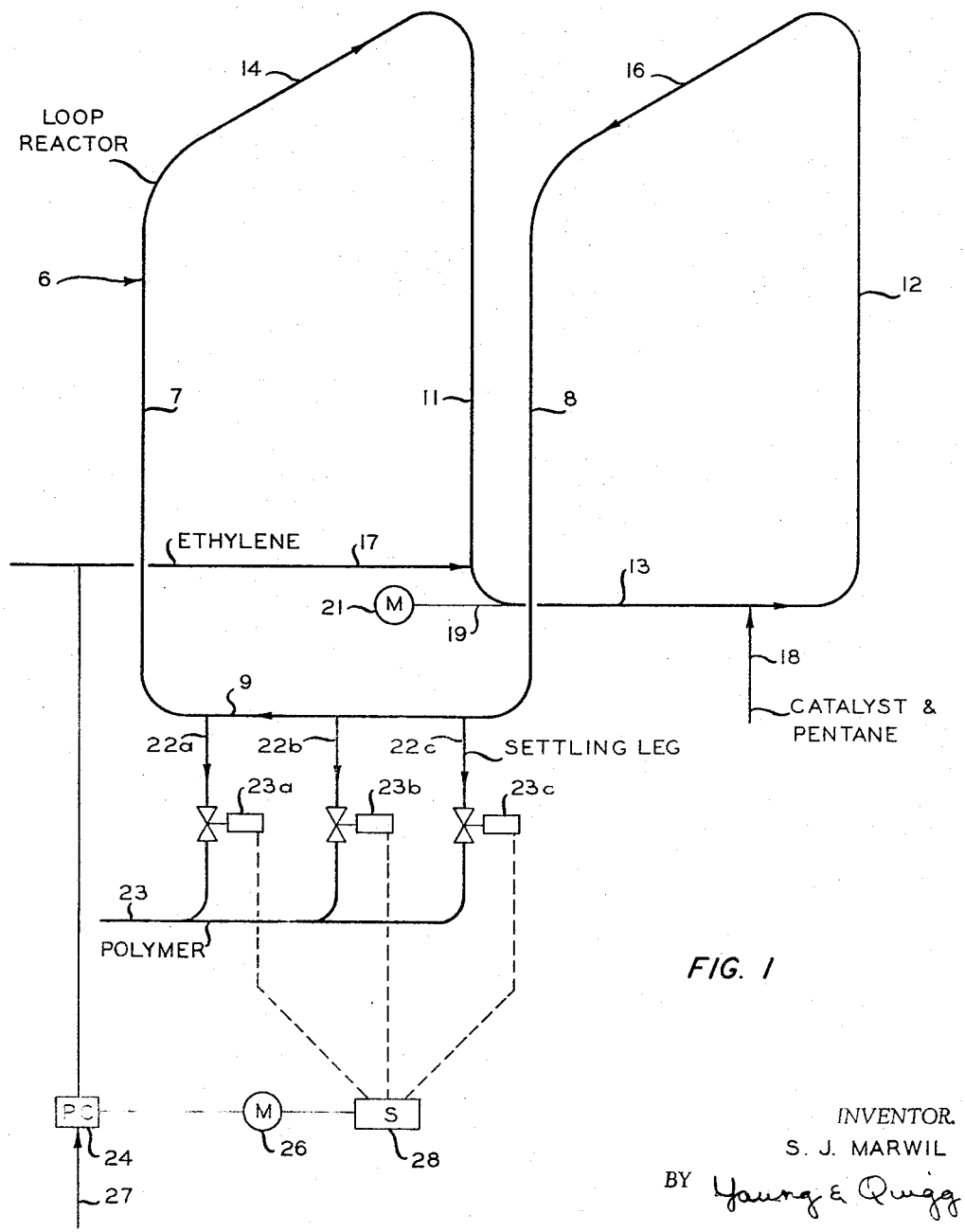
FIGURE 1 is a schematic flowsheet of a tubular loop reactor with features of this invention associated therewith.

Referring now to the drawing, and initially to FIGURE 1, there is shown a tubular loop reactor, generally designated 6, which can be made in the form of two loops, one loop comprising two vertical pipe sections 7, 8, communicating at the lower ends via a horizontal pipe section 9. The other loop similarly comprises two vertical pipe sections 11, 12, the lower ends of these pipe sections connected together via a horizontal pipe section 13. The upper ends of the vertical pipe sections of the two loops are connected by horizontal pipe sections 14, 16. Portions or all of the reactor 6 can be insulated and provided with a cooling jacket or the like. Reactor 6 thus provides a continuous path in which there is circulated a reactorfull slurry of particle-form polymer in liquid diluent, e.g., a slurry comprising 20–30 weight percent solid particle-form polymer, depending upon the reactants and reaction conditions. A conduit 17 can communicate with the lower end of one of the vertical pipe sections 11 to supply the reactor 6 with a polymerizable compound such as ethylene, and another conduit 18 can communicate with the horizontal section 13 of the same loop to supply the reactor with a stream of catalyst in liquid diluent such as pentane. The reactor 6 is operated "liquid full" and under pressure, and the flow of the polymerization reaction mixture can be maintained at a velocity sufficient to maintain the solids in suspension, e.g. in the highly turbulent flow range, at a Reynolds No. of 1 million to 35 million, or higher, by provision of an internal propeller or the like driven by drive shaft 19 connected to a suitable motive source, such as a steam-driven turbine 21, the rotational energy of the propeller being converted into flow energy.

Depending from horizontal pipe section 9 of loop reactor 6 is one or more settling legs, for example three legs 22a, 22b, 22c, which can be welded to pipe 9 or otherwise affixed thereto, the inlet ends of these settling legs communicating with the interior of pipe 9, and the outlet ends of these settling legs being connected to a discharge line 23. Portions or all of the settling legs can be insulated and provided with cooling jackets or the like. Suitable flow control valves 23a, 23b, and 23c, such as solenoid operated valves or the like, are provided in the settling legs 22a, 22b and 22c, respectively. These flow control valves can be controlled to periodically open at predetermined frequencies and sequence to permit the discharge of a slurry of concentrated settled particle-form solids which accumulate in the portions of the settling legs upstream of these valves. For example, a suitable pressure controller 24 can be connected to the ethylene supply line 17 so as to vary the speed of a variable speed motor 26 whenever the pressure in ethylene feed stream 17 (and thus reactor 6) deviates from that of a desired pressure introduced as a setpoint 27 to pressure controller 24. The variable speed motor 26 can vary a conventional sequence controller 28, which is operatively connected to the flow control valves in the settling legs. For example, in the event that the pressure in the reactor exceeds that of a desired pressure, the pressure controller 24 will speed up motor 26 which will in turn increase the frequency which the valves in the settling legs are opened by the sequence controller. The slurry of concentrated solids, e.g., 50 weight percent solids, in discharge line 23 can be passed to suitable polymer recovery equipment, for example a flash tower for removal of diluent and unreacted reactant.

As pointed out hereinabove, the flow of the stream of slurry in horiozntal pipe 9 passing the inlet ends of settling legs 22a, 22b and 22c normally sets up eddy currents, which have a delimiting effect upon the concentrating of settled polymer in the settling legs. The overcoming of this effect by the subject invention will now be described.

Figure 2:
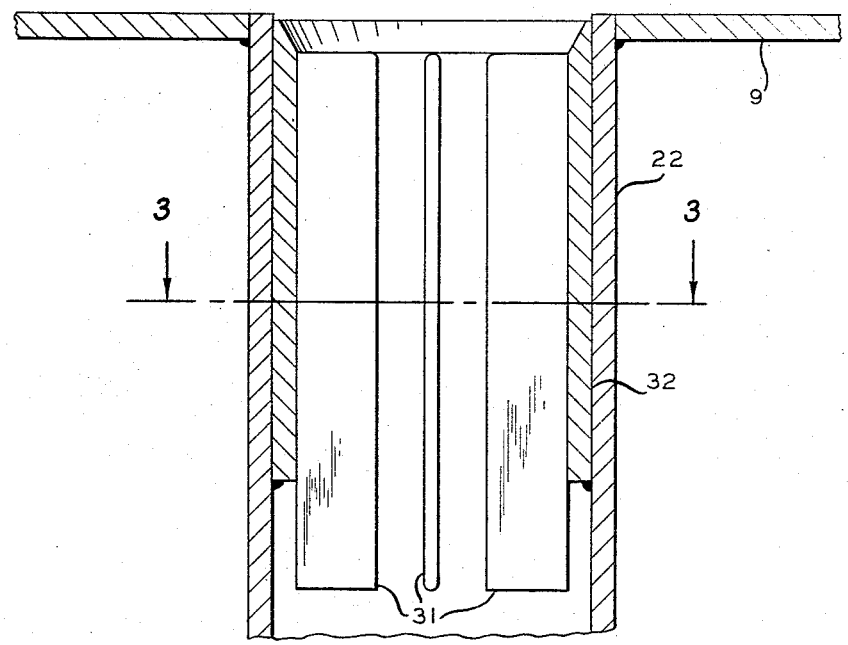
FIGURE 2 is an elevational view in section of a portion of FIGURE 1 showing details of this invention.
Figure 3:
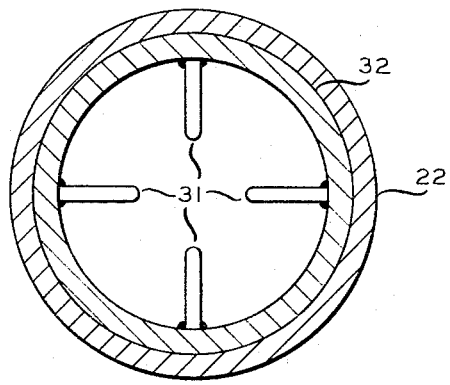
FIGURE 3 is a cross sectional view of FIGURE 2 taken along the plane indicated.

In FIGURES 2 and 3 I have illustrated in detail the inlet portion of a settling leg 22 connected to the horizontal pipe section 9 of the loop reactor 6 of FIGURE 1. According to one embodiment of this invention, there are provided a plurality of circumferentially-spaced radial vanes or baffles 31 welded or otherwise affixed to the internal periphery of the inlet section of the settling leg 22. I prefer to weld or otherwise affix these vanes 31 to a cylindrical pipe insert 32, which is in turn welded or otherwise affixed to the inner periphery of the settling leg 22 adjacent its inner end. The number of vanes 31 can vary but generally about three will be used, preferably four. Vanes 31 can be formed of flat strips of relatively thin metal, with the edges rounded. The length of the vanes 31 and their width can also vary, but usually the width will be ¼ to ⅙ the inner diameter of the settling leg, and the length will usually be about twice the latter diameter. In any case, the number of vanes, and their width and length, will be such as to prevent the delimiting effect of eddy currents upon the concentrating of polymer in the settling legs. As a result, the slurry of said solid withdrawn from the lower ends of the settling legs will be more concentrated.

In FIGURES 4 and 5 I have illustrated another embodiment of this invention. In this embodiment, there are provided a plurality of circumferentially-spaced radial vanes 36 affixed to the inner periphery of horizontal pipe 9 adjacent the inlet ends of settling legs 22a, 22b, 22c, these vanes 36 also tending to minimize or prevent the establishment of eddy currents which would otherwise tend to delimit the concentrating of solids in the settling legs. Here again, the number of vanes 36, their width and length, can vary but will be such as to overcome the establishment of eddy currents.

As mentioned earlier, this invention finds particular applicability in connection with the production of particle-form polymer in a tubular loop reactor. For example, polymerization of one or more olefins can be carried out in the modified reactor of this invention according to the process disclosed in U.S. Patent No. 2,825,721 of Hogan et al. to produce polymers and copolymers, utilizing a catalyst comprising as an essential ingredient chromium oxide, preferably including a substantial amount of hexavalent chromium. The olefin feed used for the polymerization is at least one olefin selected from 1-olefins having maximum of 8 carbon atoms per molecule and no branching nearer the double bond than the fourth position. Examples of such olefins are ethylene, propylene, 1-butene, 1-pentene and 1,3-butadiene and mixtures thereof. Such olefins can be polymerized in the presence of a hydrocarbon diluent, for example, an inert acyclic, alicyclic or aromatic compound, such as n-pentane, n-butane, isobutane, n-hexane, n-decane, cyclohexane, cyclopentane, methylcyclopentane, methylcyclohexane and the like. The preparation of insoluble particle-form polymer which is preferred is that disclosed in copending application of Leathermann et al., Ser. No. 590,569, filed June 11, 1956 and now abandoned.

The objects and advantages of this invention are further illustrated in the following example; but it should be understood that the various conditions, reactants, and other details of this example should not be construed to limit unduly this invention.

EXAMPLE

A copolymer of ethylene and butene-1 is prepared by polymerization of these monomers in a loop reactor like that illustrated in FIGURE 1. Such a reactor has a capacity of 2650 gallons and an inner diameter of 15 inches, and is operated at 210° F. and 150 p.s.i.g. To this reactor are fed 1022 lbs./hr. of ethylene, 25 lbs./hr. butene-1, and 185 gallons/hr. pentane (including fresh and recycle, with chromium oxide catalyst suspended therein). The concentration of ethylene in the loop reactor is maintained at 6.5 wt. percent, that of butene-1 at 1.0 wt. percent, and that of the copolymer at 24 wt. percent.

The loop reactor is provided with three settling legs, as shown in FIGURES 1, 2 and 3, each having an inner diameter of 4 inches, and provided with four vanes circumferentially spaced, each vane having a thickness of ⅛ inch, a width of 1¼ inches, and a length of 8 inches.

During operation of the polymerization process, the valves in the settling legs are intermittently opened at staggered frequencies every 20–50 seconds (depending on reactor pressure) for 0.2 second. A concentrated slurry of the copolymer (having a high load melt index ASTM D1238 52T of 1.6) is thus withdrawn from the settling legs with a polymer concentration of 49.5 wt. percent.

Various modifications and alterations of this invention will become apparent to those skilled in the art from the foregoing discussion and accompanying drawing, and it should be understood that this invention is not to be limited unduly to that set forth herein for illustrative purposes.

I claim:

1. A tubular loop reactor comprising at least two vertical conduit means and a horizontal conduit means connecting together the lower ends of said vertical conduit means, depending conduit means connected to said horizontal conduit means, valve means adapted to allow solids to gravitationally settle in and be withdrawn from said horizontal conduit means in said depending conduit means, and a plurality of circumferentially spaced radial vanes affixed to a peripheral portion of and extending a portion of the distance from said peripheral portion to the center of said depending conduit means adjacent the inlet end thereof, said radial vanes adapted to aid in stratification of solids and liquids in said horizontal conduit means.

2. Apparatus comprising horizontal conduit means, depending conduit means connected to said horizontal conduit means adapted to allow solids to gravitationally settle in and be withdrawn from said horizontal conduit means, valve means in said depending conduit means, and a plurality of circumferentially spaced radial vanes affixed to a peripheral portion of and extending a portion of the distance from said peripheral portion to the center of said horizontal conduit means and said depending conduit means adjacent the inlet end of the latter, said radial vanes adapted to aid in stratification of solids and liquids in said horizontal conduit means.

3. Apparatus comprising horizontal conduit means, depending conduit means connected to said horizontal conduit means adapted to allow solids to gravitationally settle in and be withdrawn from said horizontal conduit means, valve means in said depending conduit means, and a plurality of circumferentially spaced radial vanes affixed to a peripheral portion of and extending a portion of the distance from said peripheral portion to the center of said depending conduit means adjacent the inlet end thereof, said radial vanes adapted to aid in stratification of solids and liquids in said horizontal conduit means.

References Cited by the Examiner

UNITED STATES PATENTS

| | | | |
|---|---|---|---|
| 1,827,727 | 10/1931 | Blizard | 138—37 |
| 2,723,680 | 11/1955 | Danel | 137—561.1 |
| 3,108,060 | 10/1963 | Matthews | 259—4 |

FOREIGN PATENTS

| | | |
|---|---|---|
| 1,291,574 | 3/1962 | France. |
| 591,527 | 12/1960 | Belgium. |

JOSEPH L. SCHOFER, *Primary Examiner.*

F. L. DENSON, *Assistant Examiner.*

UNITED STATES PATENT OFFICE
CERTIFICATE OF CORRECTION

Patent No. 3,293,000            December 20, 1966

Stanley J. Marwil

It is hereby certified that error appears in the above numbered patent requiring correction and that the said Letters Patent should read as corrected below.

Column 4, line 61, after "valve means" strike out "adapted to allow solids to gravitationally settle in and be withdrawn from said horizontal conduit means" and insert the same after "conduit means", in same line 61, same column 4.

Signed and sealed this 21st day of November 1967.

(SEAL)
Attest:

Edward M. Fletcher, Jr.            EDWARD J. BRENNER
Attesting Officer            Commissioner of Patents